United States Patent
Ozkayar et al.

(10) Patent No.: US 12,036,553 B2
(45) Date of Patent: Jul. 16, 2024

(54) METHOD OF MICROFLUIDIC PARTICLE SEPARATION ENHANCEMENT AND THE DEVICE THEREOF

(71) Applicant: MIKRO BIYOSISTEMLER ELEKTRONIK SANAYI VE TICARET A.S., Ankara (TR)

(72) Inventors: Gurhan Ozkayar, Ankara (TR); Ender Yildirim, Ankara (TR); Ozge Zorlu, Ankara (TR)

(73) Assignee: MIKRO BIYOSISTEMLER ELEKTRONIK SANAYI VE TICARET A.S., Ankara (TR)

( * ) Notice: Subject to any disclaimer, the term of this patent is extended or adjusted under 35 U.S.C. 154(b) by 652 days.

(21) Appl. No.: 17/418,852

(22) PCT Filed: May 3, 2019

(86) PCT No.: PCT/TR2019/050295
§ 371 (c)(1),
(2) Date: Jun. 28, 2021

(87) PCT Pub. No.: WO2020/139218
PCT Pub. Date: Jul. 2, 2020

(65) Prior Publication Data
US 2022/0072551 A1    Mar. 10, 2022

(30) Foreign Application Priority Data

Dec. 28, 2018   (WO) ................ PCT/TR2018/050932

(51) Int. Cl.
*B01L 3/00* (2006.01)
*G01N 15/10* (2024.01)

(52) U.S. Cl.
CPC ... *B01L 3/502761* (2013.01); *B01L 3/502746* (2013.01); *G01N 15/10* (2013.01); *B01L 2200/0652* (2013.01); *B01L 2300/0883* (2013.01); *B01L 2400/086* (2013.01); *G01N 2015/1028* (2024.01)

(58) Field of Classification Search
CPC ..... B01L 2200/0652; B01L 2300/0883; B01L 2400/086; B01L 3/502746; B01L 3/502761; G01N 15/10; G01N 2015/1028
See application file for complete search history.

(56) References Cited

U.S. PATENT DOCUMENTS

| | | | |
|---|---|---|---|
| 2004/0144651 A1* | 7/2004 | Huang | B07B 1/00 204/601 |
| 2007/0059719 A1* | 3/2007 | Grisham | B01L 3/502753 705/2 |
| 2010/0006479 A1* | 1/2010 | Reichenbach | B01L 3/502746 209/132 |

* cited by examiner

Primary Examiner — Jennifer Wecker
(74) Attorney, Agent, or Firm — Bayramoglu Law Offices LLC

(57) ABSTRACT

A method and a device for a microfluidic separation enhancement according to size of the particles to be separated are provided. An asymmetric obstacle in a shape of a cambered hydrofoil, placed at a downstream of a microfluidic channel increases a distance between particles of different sizes, wherein the particles have been partially separated at an upstream of the microfluidic channel, resulting an enhancement in the separation efficiency. Thus, microchannel length is decreased, resulting a decrease in hydraulic resistance and footprint of the microchannel.

7 Claims, 15 Drawing Sheets

METHOD OF MICROFLUIDIC PARTICLE SEPARATION ENHANCEMENT AND THE DEVICE THEREOF

CROSS REFERENCE TO THE RELATED APPLICATIONS

This application is the national stage entry of International Application No. PCT/TR2019/050295, filed on May 3, 2019, which is based upon and claims priority to International Application No. PCT/TR2018/050932 filed on Dec. 28, 2018, the entire contents of which are incorporated herein by reference.

TECHNICAL FIELD

The present invention generally relates to microfluidics and particularly to a separation enhancement method for particles suspended in a fluid according to size. Specific application may be the separation of circulating tumor cells (CTCs) from the blood samples.

BACKGROUND

Manipulating microparticles have a great potential for identification and analysis of specific particles in many bio-chemical and clinical applications (Yoon, SciRep, 2016). The key parameter in terms of particle detection and analysis is precise manipulation of fluids and microparticles such as focusing, separation and fractionation (Zhang, LabChip, 2016). With processing or manipulating small amounts of fluids ($10^{-3}$ to $10^{-12}$ mililiters) inside channels with dimensions of tens to hundreds of micrometers (Whitesides, Nature, 2006) microfluidic techniques leap forward as powerful approaches by carrying out precise separations and detections with low fluid samples, low cost, high sensitivity, and fast sample processing (Shen, LabChip, 2017).

Enabling label-free, rapid, high-throughput and efficient particle separation is essential in microfluidic platforms (Shen, LabChip, 2017). Without applying an external field, hydrodynamic separation techniques have a significant advantage over active techniques (such as electrophoresis, dielectrophoresis, magnetic, optical, and acoustic) in terms of equipment cost and experimental set-up complexity (Sajeeh, MicrofluidNanofluid, 2014). Hydrodynamic separation basically utilizes dimensional and/or elastic properties of particles. Among these, size-based separation is the most common technique. Different theories have been developed to separate particles with two different sizes in the microchannels, but pioneering studies have been carried out by Segre and Silberberg, who first noticed the presence of equilibrium positions of particles within the flow by examining the movements of them in a channel (Segre and Silberberg, Nature, 1962).

Hydrodynamic separation is highly dependent on the interaction between the particle and the wall or the fluid, such as inertial microfluidics. In particular, inertial microfluidics provides rapid, high-throughput, label-free and efficient particle separation by manipulating the microparticles without applying any external forces and using only forces arising from the system's fluid dynamics (Schaap, MicrofluidNanofluid, 2016). The idea behind that technique is creating inertial forces without affecting laminar flow conditions in the microfluidic channels. In general, it is possible to apply inertial forces with different microchannel geometries. Examples of different microchannel geometries can be listed as straight microchannels (Zhou, LabChip, 2013; Dudani, AnalChem, 2014), curved microchannels (Yoon, LabChip, 2009), smooth microchannels with vortex-forming cavities (Sollier, LabChip, 2014), serpentine microchannels (Zhang, SciRep, 2014; Jiang, RSCAdv, 2016), and spiral microchannels (Gregoratto, Proc of SPIE, 2007; Bhagat, LabChip, 2008; Nivedita, BioMicrofluid, 2013).

In a straight channel, two forces act on the particles and cause them to cross the fluid streamlines; shear gradient lift force and the wall lift force. Because of having a Poiseuille flow profile (parabolic flow profile) shear gradient lift force drives the particles towards the channel walls while wall lift force push them away from the wall because of asymmetric wake of the particles. This competition between these two forces create a net force named as the net lift force (FL) and defines equilibrium positions for the particles in the cross-section of the channel. Cross section shape/type determines the equilibrium position amounts. A circular channel cross-section creates an annulus of equilibrium positions with a fixed distance from the center of the channel, four equilibrium positions along the four walls occur with a square cross-section, and a rectangular cross-section causes only two equilibrium positions near top and bottom walls in the middle of the channel. Net lift force is expressed as:

$$F_L = \frac{\rho 2 U_{avg}^2 a^4}{D_H^2} c_L \tag{E1}$$

where, $\rho$ is the fluid density, $U_{avg}$ is the average fluid velocity in the channel, a is the particle diameter, $c_L$ is the lift coefficient, $D_H$ is the hydraulic diameter. Hydraulic diameter is expressed as:

$$D_H = \frac{2hw}{(h+w)} \tag{E2}$$

where, h is height, and w is width of the microchannel cross-section. According to Equation 1, particle diameter is substantial on the net lift force, thus different sized particles have various equilibrium positions in the channel cross-section.

On the other hand, the necessity to focus the particles to only one equilibrium position according to their size is met with creating a biasing force which can be created via curved channels. Therefore, multiple equilibrium positions overlap at a single focusing position. Because of the mismatch on the momentum of the fluid in the center and near-wall region of the curved channel, two counter-rotating secondary flows named as Dean flows occur. Dean flow is characterized by dimensionless Dean number:

$$De = Re \sqrt{\frac{D_H}{2R}} = \frac{\rho U_{avg} D_H}{\mu} \sqrt{\frac{D_H}{2R}} \tag{E3}$$

and here, R is the radius of curvature of the channel and Re is Reynolds number of the channel where $\mu$ is the fluid viscosity. In the spiral channels, Dean flow brings the Dean force on particles with a formula given by:

$$F_D = 3\pi\mu U_D a = 5.4 \times 10^{-4} De^{1.63} a \tag{E4}$$

where (Saffman, 1965, JFluidMech), is the transverse velocity by Dean flow. According to Equation 4, particle size (a) is a deterministic parameter on the Dean force. Focusing positions of particles depend on both $F_L$ and $F_D$, and it varies significantly with the particle size ($F_L/F_D \propto a^3$). This means, different sized particles are located at different lateral positions along channel cross-section. Although main force on particle equilibrium positions is $F_L$, $F_D$ modifies these equilibrium positions, reduces the number of them and facilitates single-stream focusing in curved microchannels (Gosset, AnalChem, 2009; Warkiani, NatProtoc, 2016).

For an efficient size-based particle separation, average flow speed of the liquid ($U_{avg}$), aspect ratio of the channel (a) and the confinement ratio ($\lambda$) of the channel should be determined in parallel. Confinement ratio can be calculated by dividing the particle diameter with the hydraulic diameter ($D_H$) of the channel:

$$\lambda = \frac{a}{D_H} \quad (E5)$$

According to Martel and Toner (Martel, SciRep, 2013), particles cannot be focused at any streamline in a spiral microchannel and scattered on the lateral plane under Dean forces, if confinement ratio is much less than 0.07. If it is about 0.07 or greater than it can be possible to separate the particles based on their sizes.

EP 1 585 583 B1 discloses a method and apparatus for separating the particles according to their size. For this purpose, obstacles which provide asymmetric flow are used. It is disclosed that obstacle arrays are aligned into a microfluidic channel and array of obstacles is positioned asymmetrical with respect to the applied flow direction. However, the obstacle is not in the form of hydrofoil and an array of obstacles is essential for separation.

The use of obstacle as a form of hydrofoil was disclosed in U.S. Pat. No. 9,433,880 B2. In this patent document, separation method of suspended particles including biological material was described and booster, which might be in the form of a hydrofoil, is positioned in the channel such that a trailing edge of the boosters disposed closer to the inner wall than the outer wall of the channel, while the leading edge is disposed closer to the outer wall to create an attack angle such that it shortens the flow path and transit time of the particles. The function of hydrofoil is to narrow the separation band to boost the particles, but not to separate the particles.

In U.S. Pat. No. 9,427,688 B2, use of obstacles for dispersion of particles was disclosed. In this patent document, a field of obstacles, which can also be in the form of a hydrofoil, is utilized to disperse the particles based on the interaction of the particles and the obstacles. It was claimed that due to asymmetrical interaction of the particles with the obstacles, particles can be shifted to one side of the obstacles. However, particular use of a hydrofoil for separation of particles was not addressed.

Size-based separation can be realized on spiral shaped microfluidic channels without the need of a hydrofoil. The use of spiral channels for particle separation was disclosed in U.S. Pat. No. 8,208,138 B2. In this patent document, a spiral microchannel with plurality of loops is utilized to separate the particles of different sizes by benefiting from the Dean drag forces and lift forces on the particles. In U.S. Pat. No. 9,458,489 B2 spiral channels are utilized similarly to separate the blood cells based on their sizes. However, use of spiral channels without a hydrofoil requires several number of turns of the spiral channel to obtain significant particle separation at desired flow rate.

Such methods and devices can be utilized in liquid biopsy applications for CTC (Circulating tumor cells) separation. CTCs are the cells that disseminate into blood from primary or metastatic tumors and play a crucial role in metastatic cascade. CTCs are scarce cells present in the blood of cancer patients. Prognostic value of CTCs has been proven and approved by FDA for breast, prostate and colorectal cancer, where the higher number CTCs (>5 CTCs/7.5 ml blood) is correlated with lower overall survival rate (OSR). Other potential clinical utilities of CTCs include disease monitoring, therapy guidance, patient stratification for precision medicine and personalized therapy, screening for early diagnostics, cancer research, and drug development.

However, detection of CTCs is not easy task due to their low amount in the blood samples, as low as one CTC in a billion blood cells. None of the current CTC isolation technologies can provide necessary sensitivity, reliability, robustness, ease of use and cost efficiency, which are the most important user needs in terms of clinical and economic perspectives.

SUMMARY

The aim of the present invention is to provide enhancing separation of particles via asymmetric obstacle in the shape of cambered hydrofoil and a microfluidic size-based particle separation system composed of an upstream part that is in spiral form and a downstream part that is in straight form. As particles flow inside the upstream part of the microchannel, inertial effects cause the particles to flow in different focused pathways, which results a size-based separation. Cambered hydrofoil increases the lateral distance between particles, which results in enhancement in the separation efficiency. Thus, better separation can be achieved in a shorter spiral channel, reducing the hydraulic resistance and footprint. Being able to reduce the required number of spiral turns accompanies with other several advantages:

- Lower-pressure operation: The hydrodynamic resistance of the channel is significantly decreased if the number of turns of the spiral channel decreases. This enables working with the same fluid flow rates while applying much smaller pressure values at the inlet. This gives an advantage to the device on the regulatory side and reduces the facility requirements of the laboratory that the system will be operated.
- Throughput: As the pressure requirement is reduced, the device may be operated with higher flow rates, increasing the throughput. This brings advantage for downstream analysis as the viability of the cells drastically reduced with increased test duration.
- Smaller footprint: Reduced number of turns decreases the footprint of the device, which potentially decreases the production costs (both for MEMS and polymer fabrication techniques).

Incorporation of the hydrofoil enhances the separation efficiency. This translates to an analysis that has higher purity and recovery rate values, overriding the performance of the state-of-the-art systems.

One application of the invention is on biomedical microsystems for in vitro diagnostic purposes, while another application is related to sample preparation before any downstream analyses, such as molecular, genetic, or mutation analysis. The presented invention can be used in microfluidic platforms for enriching/separating circulating tumor cells (CTCs) from the blood samples of cancer patients benefiting from the size differences between the CTCs and other peripheral blood cells: the CTCs are typically larger than the other blood cells. Due to their larger sizes, CTCs are focused on a pathway closer to the inner wall of a spiral microchannel than the other blood cells, and therefore they can be separated from the rest of the sample by dividing the channel into two outlets (sample and waste outlets). Employing a cambered hydrofoil at the upstream of the junction of the outlet channels enhances the separation efficiency as well as it reduces the necessary channel length, associated footprint, and pressure requirement to reach the required sample flow rate.

DESCRIPTION OF THE COMPONENTS AND PARTS OF THE INVENTION

Figure 1:
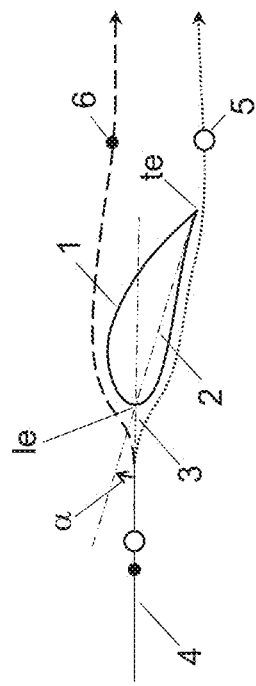
FIG. 1 is a representative view of particle separation around a cambered hydrofoil with non-zero attack angle.

The components shown in the figures prepared for a better explanation of the microfluidic particle separation enhancement device is numbered separately and explanation of each number is given below.

(1) hydrofoil
(le) leading edge
(te) trailing edge
(2) chord line
(3) main axis
(4) streamline coincident with the main axis
(5) larger particles
(6) smaller particles
(7) flow separation point
(8) vortex region
(9) streamline above the main axis of the hydrofoil
(10) streamline below the main axis of the hydrofoil
(11) 14 μm diameter particles
(12) 10 μm diameter particles
(13) Separation wall
(T) Separation wall tip
(14) distribution of larger particles
(15) distribution of smaller particles
(16) Upstream channel
(17) a, b Downstream channels
(18) a, b Different sized particles
(19) a, b Distribution of different sized particles
(20) Inlet
(21) Spiral channel
(22) a, b Outlets
(23) Streamline carrying 20 μm diameter fluorescent particles
(24) Streamline carrying 10 μm diameter fluorescent particles
(α) attack angle
(a) distance between the streamline at the upstream of the hydrofoil
(h) projected height of the hydrofoil
(d) distance between the streamlines at the close proximity at the downstream of the vortex region

DETAILED DESCRIPTION OF THE EMBODIMENTS

The present invention utilizes hydrofoils to enable and enhance the separation of different sized particles with same densities. A cambered hydrofoil (1), which is asymmetric about the chord line (2) connecting the leading edge (le) and the trailing edge (te) of the foil, located in a stream at a non-zero attack angle (α), which is the angle between the chord line and the main axis (3) measured from the main axis such that the attack angle (α) is positive as shown in FIG. 1, generates a pressure gradient along the foil accompanied with a velocity gradient, according to conservation of momentum. Hence, average velocity on one side of the foil will be higher in comparison to that on the opposite site. In this case, when a streamline coincident with the main axis (4) and carrying particles with two different sizes meets the leading edge of the foil, larger particles (5) in the stream tend to flow through one side of the foil with smaller average velocity due to their relatively high inertia. On the other hand, smaller particles (6) flow along the faster stream since they can be accelerated easier due to their smaller inertia. Therefore, the hydrofoil can be used to separate the particles in a stream, based on their sizes.

Figure 2:
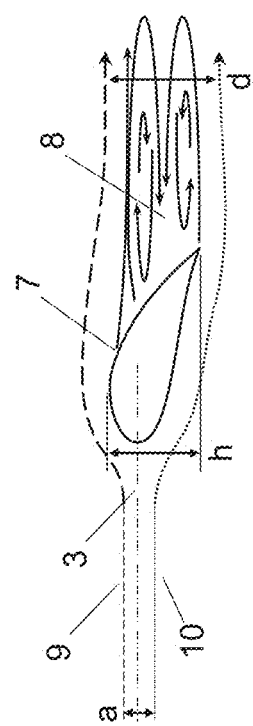
FIG. 2 is a representative view of particle separation around a cambered hydrofoil with non-zero attack angle and the vortex region at the downstream of the hydrofoil.
Figure 3:
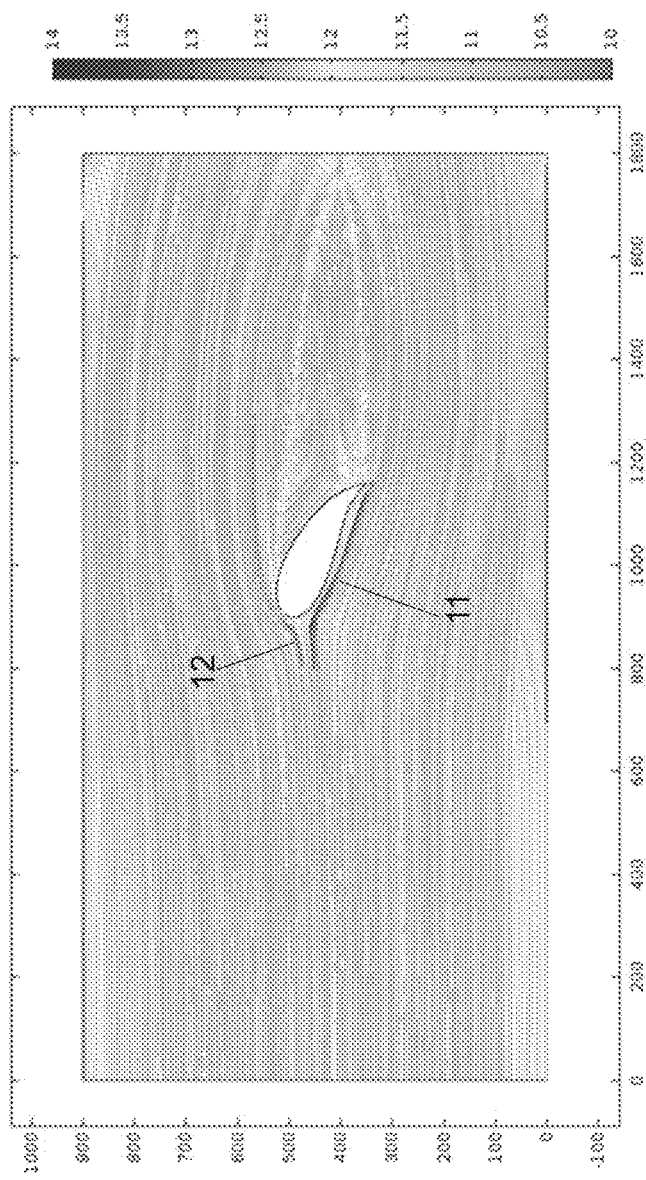
FIG. 3 is a simulation result of particle separation around a hydrofoil, where larger size particles flow below the hydrofoil.
Figure 4:
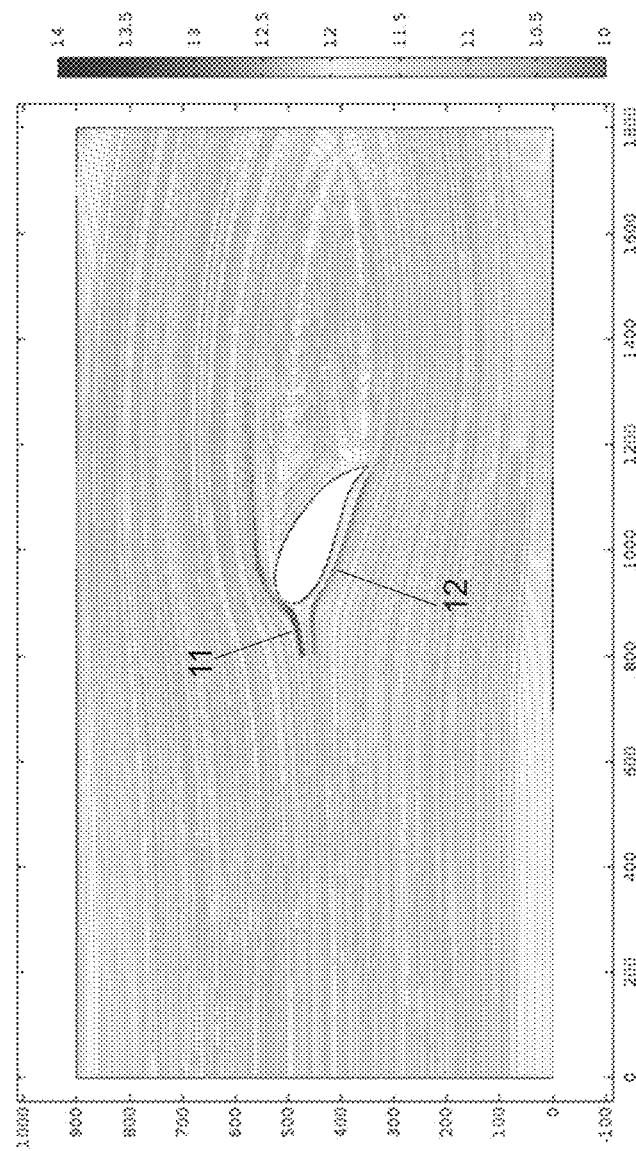
FIG. 4 is a simulation result of particle separation around a hydrofoil, where larger size particles flow above the hydrofoil.

Another aspect with utilizing hydrofoils with non-zero attack angle is the flow separation and the downstream vortices, as presented in FIG. 2. When the flow speed is sufficiently high, viscous effects become relatively less effective and the inertia of the fluid becomes dominant. Hence, the flow cannot follow the hydrofoil surface and gets separated. The point where this occurs is termed as the flow separation point (7). At the downstream of the flow separation point, vortices are formed to satisfy the conservation of angular momentum of the fluid. If a flow carrying particles gets separated from the surface of the hydrofoil, particles in the stream tend not to drift towards the vortex region (8). Therefore, particles separated according to their sizes at the leading edge of the hydrofoil do not meet at the downstream of the hydrofoil within the vortex region. Consequently, when two particle-carrying parallel streamlines meet the hydrofoil, such that one streamline (9) is above the main axis (3) of the hydrofoil and the other streamline (10) being below the main axis (3) of the hydrofoil and there is a distance (a) between the streamlines at the upstream of the hydrofoil, which is less than the projected height of the hydrofoil (h), then since the particles past the hydrofoil cannot drift into the vortex-region (8), the distance between the streamlines (d) at the close proximity at the downstream of the vortex region will be greater than (a) as illustrated in FIG. 2, enhancing the separation of the particles. This result is irrespective of whether streamline (9) or streamline (10) carries the larger or smaller particles, since the streamlines cannot cross the main axis (3) passing through the leading edge of the hydrofoil at the upstream. FIG. 3 presents the results of the simulation showing the trajectories of 14 µm diameter particles (11) and 10 µm diameter particles (12) carried by streamlines below and above the main axis, respectively. FIG. 4 represents the case in which 14 µm diameter particles (11) and 10 µm diameter particles (12) carried by streamlines above and below the main axis, respectively.

Figure 5:
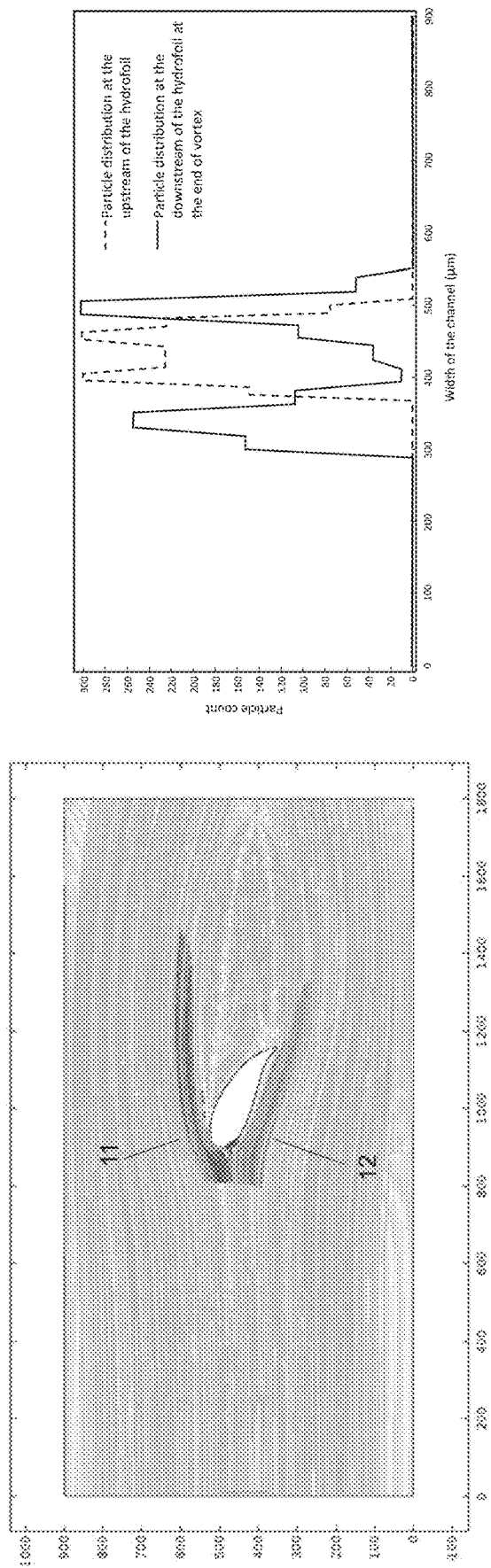
FIG. 5 is a simulation result of distribution of different sized particles around a hydrofoil, where larger size particles flow above the hydrofoil.
Figure 6:
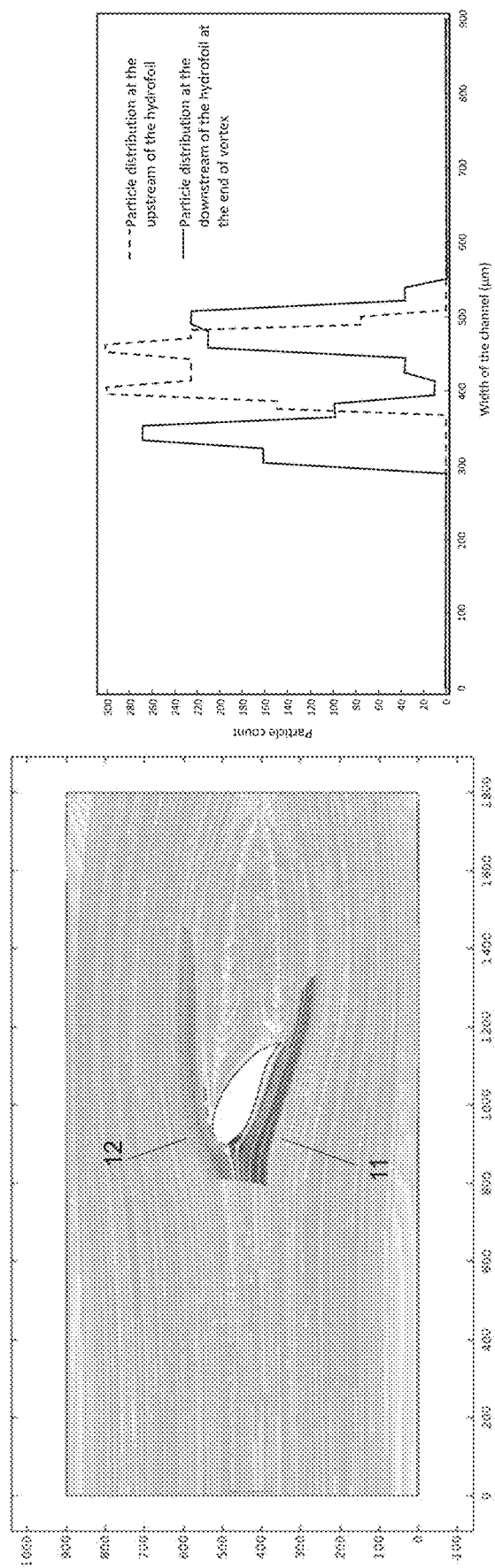
FIG. 6 is a simulation result of distribution of different sized particles around a hydrofoil, where larger size particles flow below the hydrofoil.

In case when different sized particles are not focused on single streamlines but distributed over several streamlines, wherein these two particle distributions coincide at the main axis (3), either particle separation or enhancement of particle separation occurs at the downstream of the hydrofoil. Here, the efficiency of the particle separation can be characterized by referring to the definition of resolution commonly used in chromatography applications (T. Hanai, 1999):

$$R = 1.18 \frac{d_{p,2} - d_{p,1}}{w_{0.5h,1} - w_{0.5h,2}} \quad (E6)$$

where, R is the resolution, $d_{p,2}$ is the location of the peak of smaller (or larger) particles along the channel width, $d_{p,1}$ is the location of the peak of larger (or smaller) particles along the channel width, $w_{0.5h,1}$ is the width of the distribution of larger (or smaller) particles at half height of its distribution peak, and $w_{0.5h,2}$ is the width of the distribution of smaller (or larger) particles at half height of its distribution peak. Practically, R>1 indicates that the distribution of the particles does not overlap. Referring to this definition, in case where the attack angle (α) is positive, the result will be the enhancement in the efficiency of the particle separation when larger sized particles are distributed about a streamline passing through the low pressure side of the hydrofoil (such as streamline (9) in FIG. 2); otherwise, the result will be complete particle separation with R>1. Accordingly, FIG. 5 shows the results of the simulation in which a hydrofoil with a positive attack angle (α) is located in the stream and 14 µm diameter particles (11) are distributed about a streamline which passes through the lower pressure side of the hydrofoil above the main axis, while 10 µm diameter particles (12) are distributed about a streamline which passes through the higher pressure side of the hydrofoil below the main axis. It is seen that some of the 14 µm diameter particles (11) flow with the streamlines carrying 10 µm diameter particles (12). However, the distance between the peak points of the distributed particles is increased at the downstream of the hydrofoil, which indicates improved R value hence separation efficiency. On the other hand, FIG. 6 shows the results of the simulation in which the same hydrofoil in FIG. 5 is used and 14 µm diameter particles (11) are distributed about a streamline which passes through the higher pressure side of the hydrofoil below the main axis, while 10 µm diameter particles (12) are distributed about a streamline which passes through the lower pressure side of the hydrofoil above the main axis. The results show that none of the 14 µm diameter particles (11) flow with the streamlines carrying 10 µm diameter particles (12) and the distance between the distributions of the particles is increased at the downstream of the hydrofoil.

Figure 7:
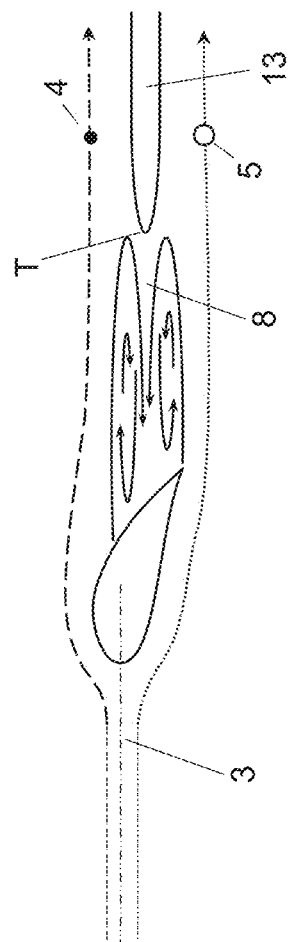
FIG. 7 is a representative view of particle separation around a hydrofoil and flow of the particles around a separation wall located at the downstream of the hydrofoil.
Figure 8:
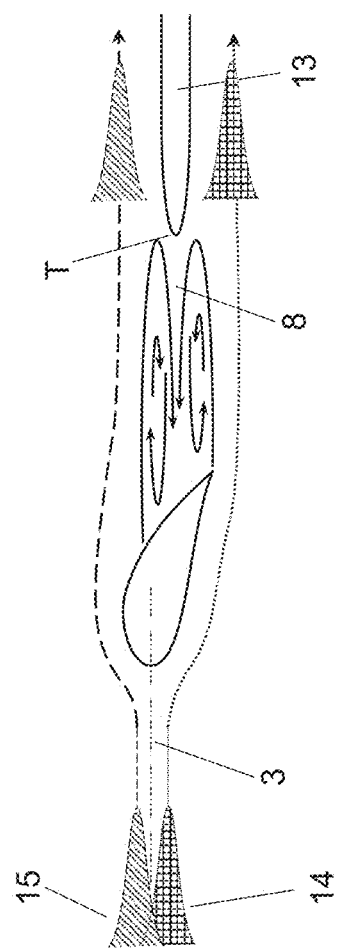
FIG. 8 is a representative view of separation of distribution of particles around a hydrofoil and flow of the distribution of particles around a separation wall located at the downstream of the hydrofoil.

Another aspect with utilizing hydrofoils is related to the vortex region (8) at the downstream of the hydrofoil. Since particles past the hydrofoil do not tend to drift into the vortex region (8), a separation wall (13), which divides the stream into two distinct streams (3) and the tip (T) of which is located right at the downstream end of the vortex region, prevents mixing of different sized particles, which are already separated by the hydrofoil, along the separation wall (13). FIG. 7 represents this case in which larger particles (5) and smaller particles (4) carried by parallel streams, one of which is above and the other is below the main axis (3), are separated by a hydrofoil and a separation wall (13) located at the downstream. Similarly, FIG. 8 represents the case in which distribution of larger particles (14) and distribution of smaller particles (15) are separated by a hydrofoil and a separation wall (13) is located at the downstream.

Figure 9:
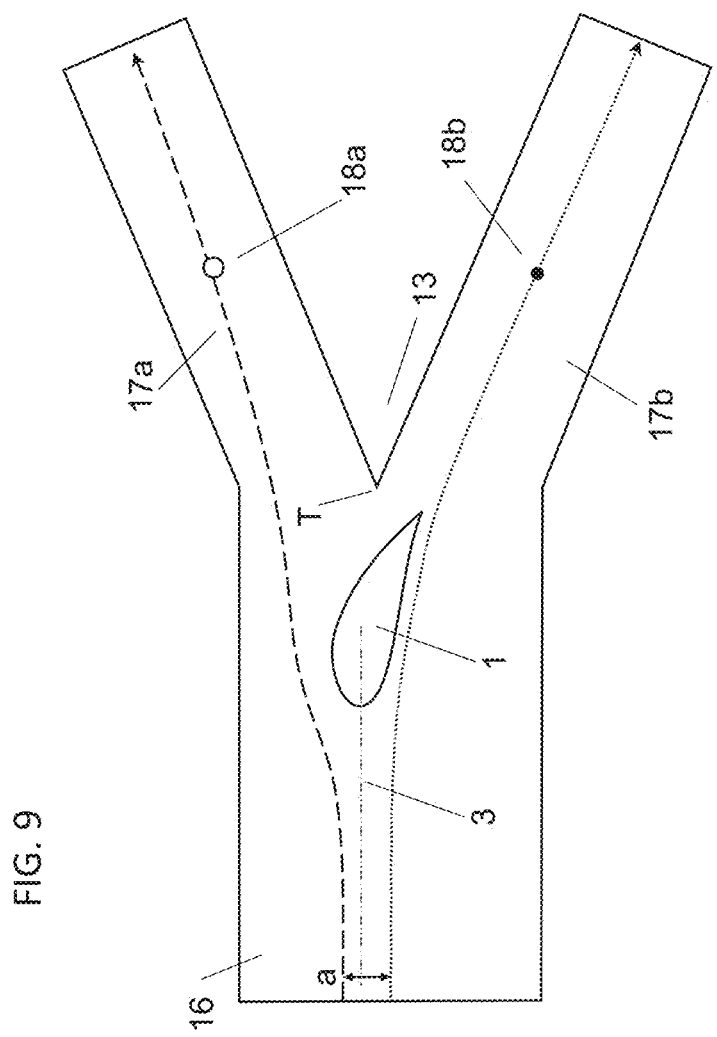
FIG. 9 is a representative view of an embodiment, where different sized particles are separated by a hydrofoil and flow through two different downstream channels.

Methods illustrated in FIGS. 2 and 7 can be utilized in an embodiment utilizing hydrofoils to separate particles of similar density based on their sizes, as shown in FIG. 9. The embodiment includes one upstream channel (16), two downstream channels (17a, 17b), and a hydrofoil (1) located at the near upstream of the intersection of the downstream channels. Particle carrying streamlines with distance (a) in between, such that one streamline is above and the other is below the main axis (3), in the upstream channel (16) will be separated at the hydrofoil (1) and directed to downstream channels (17a, 17b). Thus, different sized particles (18a, 18b) can be collected at different downstream channels (17a, 17b).

Figure 10:
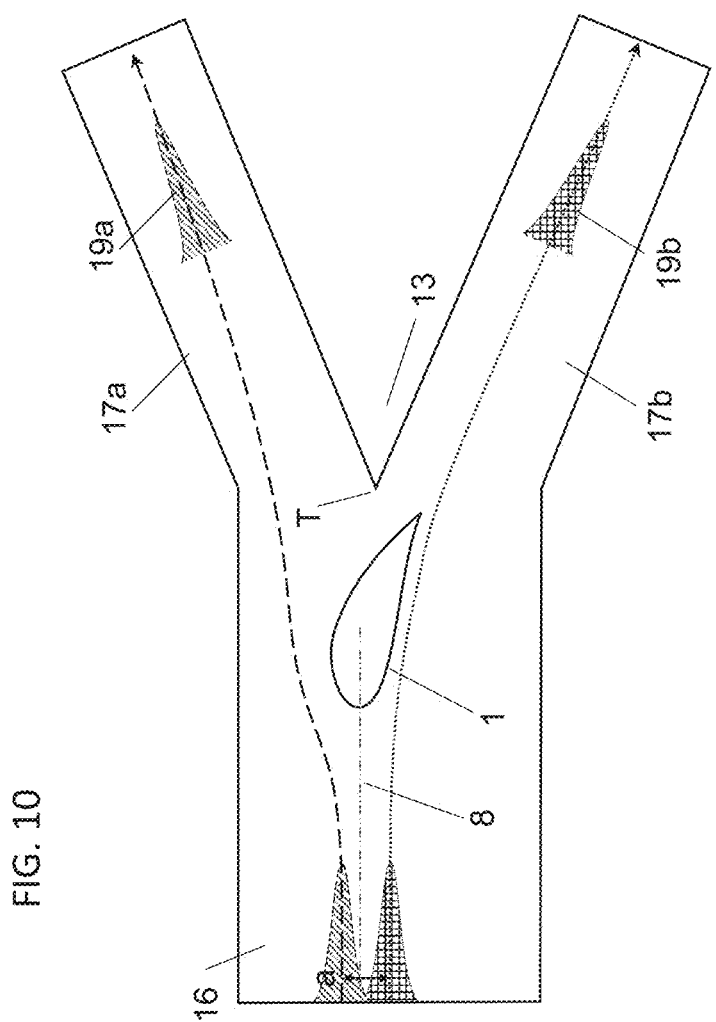
FIG. 10 is a representative view of an embodiment, where distributions of different sized particles are separated by a hydrofoil and flow through two different downstream channels.

Another embodiment shown in FIG. 10 utilizes the methods illustrated in FIGS. 5, 6, and 7. This embodiment again includes one upstream channel (16), two downstream channels (17a, 17b), and a hydrofoil (1) located at the near upstream of the intersection of the downstream channels. Streams carrying distribution of different sized particles (19a, 19b) with a distance (a) in between their peak positions, such that the peak positions are located at two sides of the main axis (3), in the upstream channel will be separated at the hydrofoil (1) and directed to different downstream channels. When larger sized particles are distributed about a streamline which passes through the lower pressure side of the hydrofoil, such as streamline (9) in FIG. 2, the result is the enhancement of the particle separation and collection of separated particles at downstream channels (17a, 17b). Otherwise, the result is a complete particle separation and collection of separated particles at downstream channels (17a, 17b).

Figure 11:
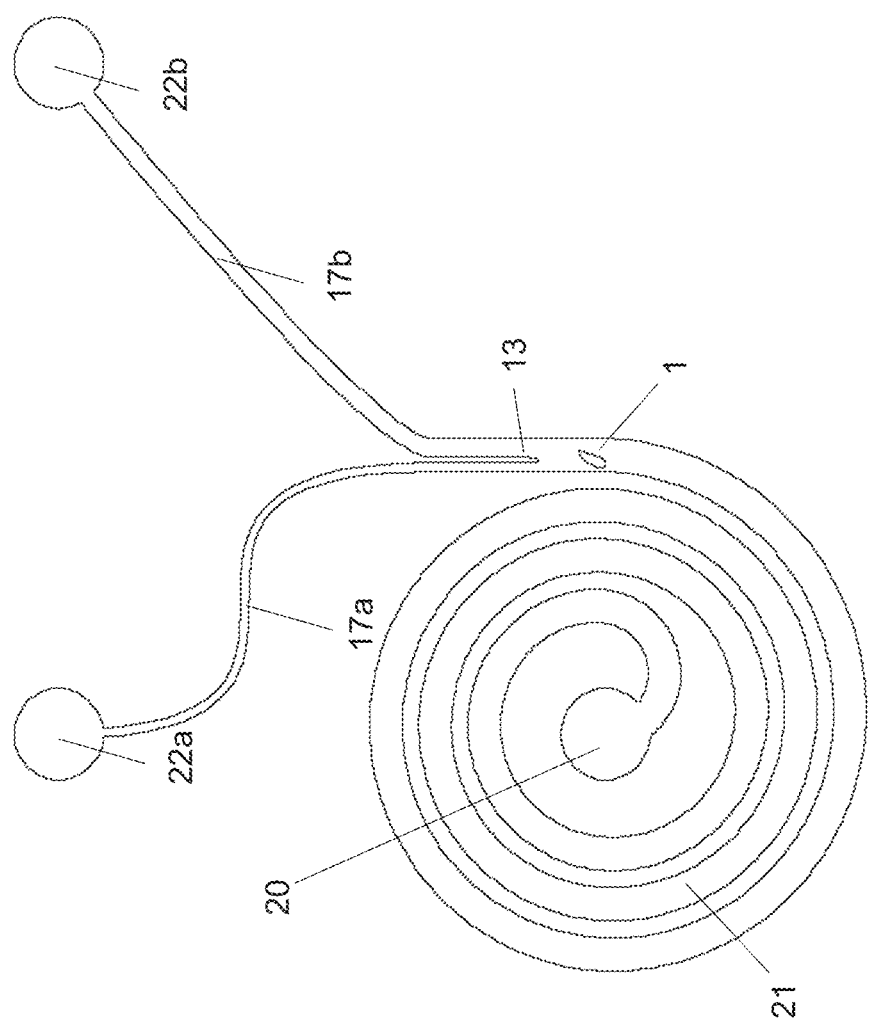
FIG. 11 is a representative view of an embodiment, which is composed of a spiral upstream channel, a hydrofoil and a separation wall at the downstream, and two downstream channels.

The upstream channel (16) in FIGS. 9 and 10 can be in the form of a spiral (FIG. 11). In this embodiment, when a mixture of different sized particles is dispensed through the inlet (20), Dean vortices formed across the spiral channel

(21) cause different sized particles focus on or distribute about two distinct streamlines. The particles carried by these streamlines can be separated by a hydrofoil (1) and separated particles can be directed to different outlets (22a, 22b) through downstream channels (17a, 17b) divided by a separation wall (13).

Figure 12:
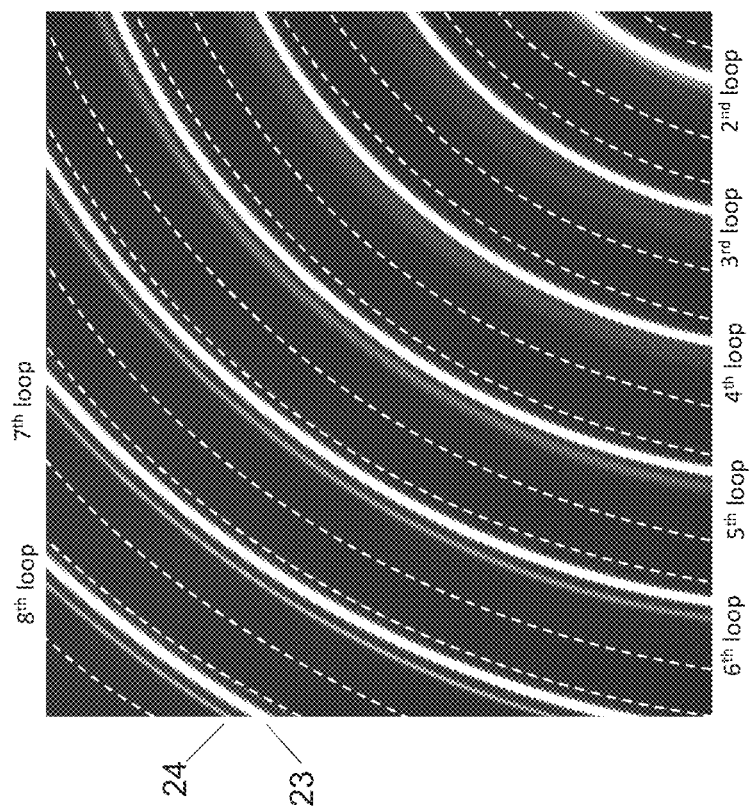
FIG. 12 is an experiment result showing focusing of different sized particles along a spiral channel.
Figure 13:
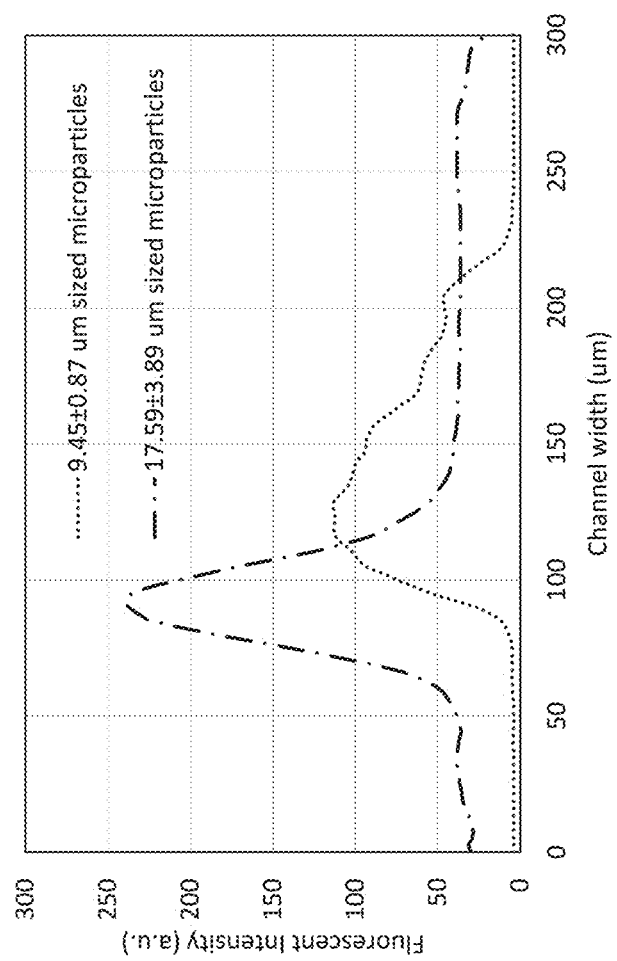
FIG. 13 is an experiment result showing the distribution of different sized particles at a cross section along a spiral channel.
Figure 14:
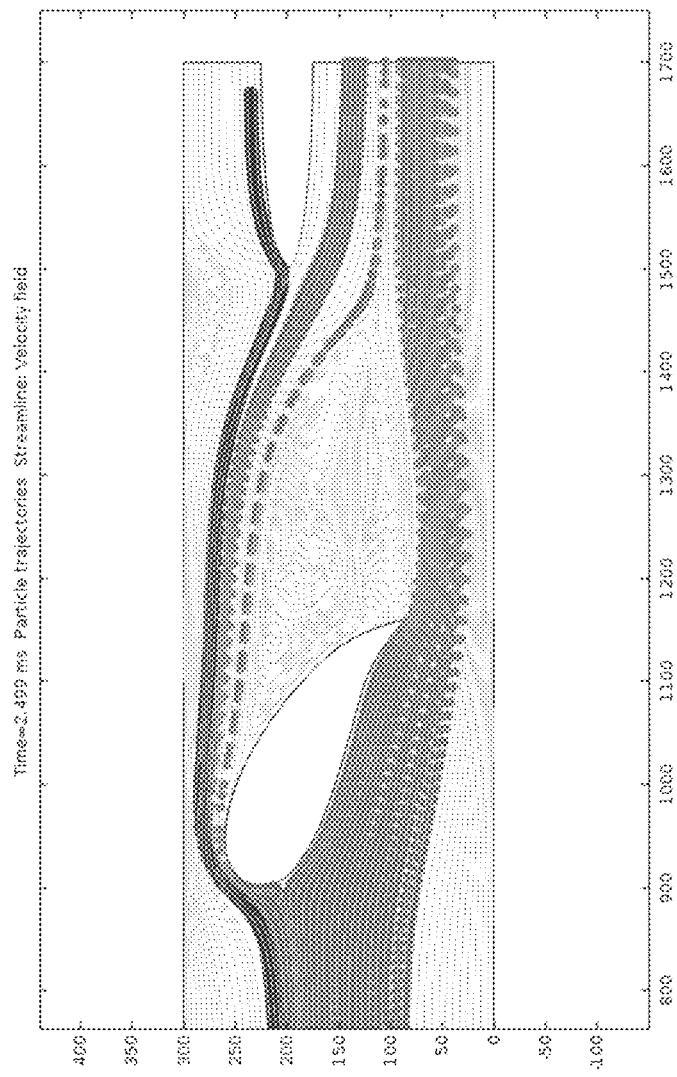
FIG. 14 is a simulation results showing separation of distribution of particles around a hydrofoil and flow around a separation wall.
Figure 15:
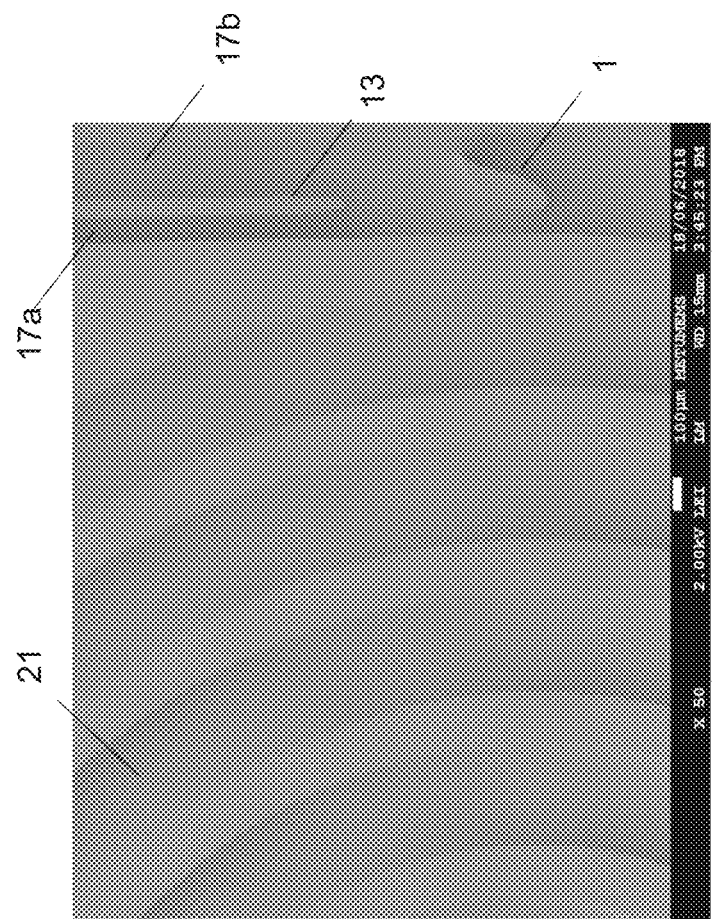
FIG. 15 is SEM image of an embodiment showing an upstream spiral channel, a hydrofoil and a separation wall at the downstream, and two downstream channels.

In case of a spiral channel, particles typically tend to get distributed about a streamline at the inner loops of the spiral and get focused on the streamline at the outer loops as they flow in the spiral (Gregoratto, Proc of SPIE, 2007; Bhagat, LabChip, 2008; Nivedita, BioMicrofluid, 2013). FIG. 12 shows the focusing of fluorescent particles with nominal diameters of 10 µm and 18 µm at distinct streamlines (23, 24), where streamline (23) is visualized by the fluorescence of 18 µm diameter particles and streamline (24) is formed by the fluorescence of 10 µm diameter particles. As shown in FIG. 12, although larger particles are focused at earlier loops, focusing of both small and large particles is observed only after the 6th loop of the spiral. By utilizing hydrofoils, it is possible to separate the particles at earlier loops, which eliminates the need for long spiral channels thus decreasing the overall hydrodynamic resistance. FIG. 13 shows the distribution of the particles with nominal diameters of 10 µm (9.45±0.87 µm) and 18 µm (17.59±3.89 µm) based on their fluorescent intensities across the $3^{rd}$ loop of the 300 µm wide spiral channel. Nominally 10 µm diameter particles are distributed between 80 µm and 220 µm of the width of the channel while nominally 18 µm diameter particles are distributed narrowly about a streamline located at 95 µm. Simulations based on this experimental data shows that particles with nominal diameters of 10 µm and 18 µm can be separated by utilizing a hydrofoil with 30 degrees attack angle and a separation wall located right at the downstream end of the vortex region (FIG. 14). Therefore, another embodiment, whose scanning electrode micrograph presented in FIG. 15, can be used to separate particles that are distributed over several streamlines. The embodiment comprises of a upstream spiral channel (21), hydrofoil (1), a separation wall (13), and two downstream channels (17a, 17b).

In one embodiment of the invention a method for separating particles according to their sizes via a cambered hydrofoil is disclosed, where forwarding particles to the cambered hydrofoil, on a streamline coincident with the main axis (4) passing through the leading edge (le) having an attack angle of a with the chord line. Said cambered hydrofoil is asymmetric about the chordline connecting the leading edge (le) and the trailing edge (te) of the hydrofoil making non-zero attack angle with the main axis which is the axis parallel to the stream and passing through the leading edge of the hydrofoil.

In another embodiment of the invention, a method for enhancing the separation of two particle-carrying parallel streamlines is disclosed, where one streamline is above the main axis of the hydrofoil and the other streamline being below the main axis of cambered hydrofoil and there is a distance (a) between the streamlines at the upstream of the cambered hydrofoil, which is less than the projected height (h) of the cambered hydrofoil, characterized in that forwarding two particle-carrying parallel streamlines to meet the cambered hydrofoil, then since the particles past the cambered hydrofoil cannot drift into the vortex-region (8) formed at the downstream of the flow separation point (7) on the cambered hydrofoil, distance between streamlines (d) at the close proximity at the downstream of the vortex region will be greater than (a).

In other embodiment of the invention a method for increasing the resolution of separation (R) according to below formula $$R = 1.18 \frac{d_{p,2} - d_{p,1}}{w_{0.5h,1} - w_{0.5h,2}}$$

of two distributions of two different sized particles coinciding at the main axis is disclosed, where one distribution peak is above the main axis of the hydrofoil and the other distribution peak is below the main axis of cambered hydrofoil, characterized in that forwarding said two particle distributions to cambered hydrofoil then since the particles in the distributions past the cambered hydrofoil cannot drift into the vortex-region (8) formed at the downstream of the flow separation point (7) on the cambered hydrofoil, the particles on the streamlines above the main axis follow a path through the upper side of the hydrofoil, the particles on the streamlines below the main axis follow a path through the lower side of the hydrofoil, and particles on the streamline coincident with the main axis follow a path such that larger particles on the streamline tend to flow through side of the hydrofoil with smaller average velocity and smaller particles flow through the side of the hydrofoil with larger average velocity.

In another embodiment, a method for preventing mixing of different sized particles, which are already separated or enhanced or resolution is increased by a hydrofoil via a separation wall (13) which divides the stream into two distinct streams, where, the separation wall (13) tip (T) is located right at the downstream end of vortex region (8) formed at the downstream of the flow separation point (7) on a cambered hydrofoil A device using all methods given above is also presented by the invention comprising one upstream channel, two downstream channels, separation wall (13) between these two downstream channels, and the separation wall tip (T) is located right at the downstream end of the vortex region formed at the downstream of the flow separation point on a cambered hydrofoil, wherein streamlines carrying different sized particles at the upstream channel with distance (a) in between, such that one streamline is above and the other is below the main axis, are separated at the hydrofoil and directed to the downstream channels such that different sized particles can be collected separately. The device further comprises one inlet (20) operative to receive fluid containing particles and two outlets (22) operative to deliver fluid containing particles, wherein the upstream channel is in form of a spiral (21).

REFERENCES

Yoon, Y., Seonil Kim, Jusin Lee, Jaewoong Choi, Rae-Kwon Kim, Su-Jae Lee, Onejae Sul & Seung-Beck Lee "Clogging-free microfluidics for continuous size-based separation of microparticles", Sci. Rep. 6, 26531 (2013).

Zhang J., Yan S., Yuan D., Alici G., Nguyen N-T., Warkiani M. E. and Li W., "Fundamentals and applications of inertial microfluidics: a review", Lab Chip, 2016.16, 10-34

Whitesides G. M., "The origins and the future of microfluidics", NATURE|Vol 442|July 2006.

Shen S., Tian C., Li T., Xu J., Chen S-W., Tu Q., Yuan M-S., Liu W. and Wang J., "Spiral microchannel with ordered micro-obstacles for continuous and highly-efficient particle separation", Lab Chip, 2017, 17, 3578.
Sajeesh P., Sen A. K., "Particle separation and sorting in microfluidic devices: a review", Microfluid Nanofluid (2014) 17:1-52.
Segre G. and Silberberg A., "Behaviour of macroscopic rigid spheres in Poiseuille flow. Part 2. Experimental results and interpretation," J. Fluid Mech. 14, 136-157 (1962).
Schaap A., Dumon J., den Toonder J, "Sorting algal cells by morphology in spiral microchannels using inertial microfluidics", Microfluid Nanofluid (2016) 20:125.
Zhou J. and Papautsky I., "Fundamentals of inertial focusing in microchannels", Lab Chip, 2013, 13, 1121-1132.
Dudani J. S., Go D. E., Gossett D. R., Tan A. P. and Di Carlo D., "Mediating millisecond reaction time around particles and cells", Anal. Chem. 2014, 86, 3, 1502-1510.
Yoon D. H., Ha J. B., Bahk Y. K., Arakawa T., Shoji S. and Go J. S., "Size-selective separation of micro beads by utilizing secondary flow in a curved rectangular microchannel" Lab Chip, 2009, 9, 87-90.
Sollier E., Go D. E., Che J., Gossett D. R., O'Byrne S., Weaver W. M., Kummer N., Rettig M., Goldman J., Nickols N., McCloskey S., Kulkarni R. P. and Di Carlo D., "Size-selective collection of circulating tumor cells using Vortex technology", Lab Chip, 2014, 14, 63.
Zhang, J., Yan S., Sluyter R., Li W. I, Alici G. & Nguyen N-T., "Inertial particle separation by differential equilibrium positions in a symmetrical serpentine micro-channel.", Sci. Rep. 4, 4527 (2014).
Jiang D., Tang W., Xiang N. and Ni Z., "Numerical simulation of particle focusing in a symmetrical serpentine microchannel", RSC Adv., 2016, 6, 57647.
Gregoratto I., McNeil C. J., Reeks M. W., "Micro-devices for rapid continuous separation of suspensions for use in micro-total-analysis-systems (µTAS)", Proc. of SPIE Vol. 6465 646503-1, 2007.
Bhagat A. A. S., Kuntaegowdanahalli S. S. and Papautsky I., "Continuous particle separation in spiral microchannels using dean flows and differential migration", Lab Chip, 2008, 8, 1906-1914.
Nivedita N. and Papautsky I., "Continuous separation of blood cells in spiral microfluidic devices", Biomicrofluidics 7, 054101 (2013).
Saffman P. G., "The lift on a small sphere in a slow shear flow", J. Fluid Mech. 22, 2, 1965, pp:385-400.
Gossett D. R. and Di Carlo D., "Particle Focusing Mechanisms in Curving Confined Flows", Anal. Chem. 2009, 81, 8459-8465.
Warkiani M. E., Khoo B. L., Wu L., Tay A. K. P., Bhagat A. A. S., Han J. & Lim C. T., "Ultra-fast, label-free isolation of circulating tumor cells from blood using spiral microfluidics", VOL. 11 NO. 1|2016|Nature Protocols, 134-148.
Martel, J. M. & Toner, M., "Particle Focusing in Curved-Microfluidic Channels." Sci. Rep. 3, 3340 (2013).
T. Hanai, "HPLC A Practical Guide", The Royal Society of Chemistry, U K, 1999, pp. 96-97.

What is claimed is:

1. A method for separating particles according to sizes of the particles via a cambered hydrofoil, comprises
forwarding particles to the cambered hydrofoil, on a streamline coincident with a main axis passing through a leading edge having an attack angle of α with a chord line.

2. The method according to claim 1, wherein the cambered hydrofoil is asymmetric about the chord line connecting the leading edge and a trailing edge of the cambered hydrofoil making a non-zero attack angle with the main axis, wherein the main axis is parallel to a stream and passing through the leading edge of the cambered hydrofoil.

3. A method for enhancing a separation of two particle-carrying parallel streamlines, wherein a first streamline of the two particle-carrying parallel streamlines is above a main axis of a cambered hydrofoil and a second streamline of the two particle-carrying parallel streamlines is below the main axis of the cambered hydrofoil and a first distance between the first streamline and the second streamline at an upstream of the cambered hydrofoil, wherein the first distance is less than a projected height of the cambered hydrofoil, the method comprises
forwarding the two particle-carrying parallel streamlines to meet the cambered hydrofoil, then since particles past the cambered hydrofoil cannot drift into a vortex region formed at a downstream of a flow separation point on the cambered hydrofoil, a second distance between the first streamline and the second streamline at a close proximity at a downstream of the vortex region is greater than the first distance.

4. A method for increasing a resolution of a separation of two particle distributions of two different sized particles according to a formula $$R = 1.18 \frac{d_{p,2} - d_{p,1}}{w_{0.5h,1} - w_{0.5h,2}}$$

wherein a first distribution peak is above the main axis of a cambered hydrofoil and a second distribution peak is below the main axis of the cambered hydrofoil, the method comprises
forwarding the two particle distributions to the cambered hydrofoil, wherein
then since the two different sized particles in the two particle distributions past the cambered hydrofoil cannot drift into a vortex region formed at a downstream of a flow separation point on the cambered hydrofoil,
the particles on streamlines above the main axis follow a first path through an upper side of the cambered hydrofoil,
the particles on the streamlines below the main axis follow a second path through a lower side of the cambered hydrofoil, and
the two different sized particles on a streamline coincident with the main axis follow a third path, wherein larger particles on the streamline tend to flow through a side of the cambered hydrofoil with a smaller average velocity and smaller particles flow through the side of the cambered hydrofoil with a larger average velocity.

5. A method for preventing mixing of different sized particles, by a cambered hydrofoil via a separation wall dividing a stream into two distinct streams, wherein a separation wall tip is located right at a downstream end of a vortex region formed at a downstream of a flow separation point on the cambered hydrofoil, wherein
(1) the different sized particles are separated by a method for separating particles according to sizes of the particles via the cambered hydrofoil, comprising the following steps
forwarding particles to the cambered hydrofoil, on a streamline coincident with a main axis passing through a leading edge having an attack angle of α with a chord line;

or, (2) a separation of the different sized particles on two particle-carrying parallel streamlines is enhanced by a method for enhancing a separation of the two particle-carrying parallel streamlines, wherein a first streamline of the two particle-carrying parallel streamlines is above a main axis of the cambered hydrofoil and a second streamline of the two particle-carrying parallel streamlines is below the main axis of the cambered hydrofoil and a first distance between the first streamline and the second streamline at an upstream of the cambered hydrofoil, wherein the first distance is less than a projected height of the cambered hydrofoil, the method for enhancing the separation of the two particle-carrying parallel streamlines comprises forwarding the two particle-carrying parallel streamlines to meet the cambered hydrofoil, then since particles past the cambered hydrofoil cannot drift into the vortex region formed at a downstream of a flow separation point on the cambered hydrofoil, a second distance between the first streamline and the second streamline at a close proximity at a downstream of the vortex region is greater than the first distance;

or, (3) a resolution of a separation of two particle distributions of the two different sized particles is increased according to a formula $$R = 1.18 \frac{d_{p,2} - d_{p,1}}{w_{0.5h,1} - w_{0.5h,2}}$$

wherein a first distribution peak is above the main axis of the cambered hydrofoil and a second distribution peak is below the main axis of the cambered hydrofoil, the method for increasing the resolution of the separation of the two particle distributions of the two different sized particles coinciding at the main axis comprises forwarding the two particle distributions to the cambered hydrofoil, wherein then since the two different sized particles in the two particle distributions past the cambered hydrofoil cannot drift into the vortex region formed at a downstream of a flow separation point on the cambered hydrofoil, the particles on streamlines above the main axis follow a first path through an upper side of the cambered hydrofoil, the particles on the streamlines below the main axis follow a second path through a lower side of the cambered hydrofoil, and the two different sized particles on a streamline coincident with the main axis follow a third path, wherein larger particles on the streamline tend to flow through a side of the cambered hydrofoil with a smaller average velocity and smaller particles flow through the side of the cambered hydrofoil with a larger average velocity.

6. A device using the method of claim 5, comprising one upstream channel, two downstream channels, the separation wall between the two downstream channels, and the separation wall tip is located right at the downstream end of the vortex region formed at the downstream of the flow separation point on the cambered hydrofoil, wherein streamlines carry the different sized particles at the one upstream channel with a distance in between the streamlines, wherein a first streamline of the streamlines is above the main axis and a second streamline of the streamlines is below the main axis, the first streamline and the second streamline are separated at the cambered hydrofoil and directed to the two downstream channels for the different sized particles to be collected separately.

7. The device of claim 6, further comprising one inlet operative to receive fluid containing particles and two outlets operative to deliver the fluid containing particles, wherein the one upstream channel is in form of a spiral.

* * * * *